June 1, 1943.  H. HERTEL  2,320,597
SUPPORTING FLOAT FOR AIRCRAFT
Filed March 31, 1939   2 Sheets-Sheet 1

Inventor
Heinrich Hertel

By his Attorney

June 1, 1943.  H. HERTEL  2,320,597
SUPPORTING FLOAT FOR AIRCRAFT
Filed March 31, 1939    2 Sheets-Sheet 2

Patented June 1, 1943

2,320,597

UNITED STATES PATENT OFFICE 2,320,597

SUPPORTING FLOAT FOR AIRCRAFT

Heinrich Hertel, Rostock, Germany; vested in the Alien Property Custodian

Application March 31, 1939, Serial No. 265,269
In Germany April 1, 1938

5 Claims. (Cl. 244—102)

It is known to provide supporting floats oscillatable in the wing of aircraft, between fuselage and wing tip. In the case of small wings of slight thickness such supporting floats cannot always be accommodated perfectly in the wing and even in the case of large wings it is necessary to provide either complicated cross beam constructions for the sake of strength or cross beam recesses in the float for accommodating the supporting floats.

The object of the invention is, to swing the supporting float completely into even the smallest wings without weakening the cross beam construction and without float recesses, and this object is attained by making the float or a part thereof oscillatable on its supporting stay. Between the supporting stay and the float or the float part a suitable joint is arranged. The supporting stay is retractable into the wing with the oscillated float or with the rigid and oscillatable float parts. The float in retracted position may lie with its longitudinal axis in the longitudinal direction of the wing. The swinging in is effected by changing the longitudinal axis of the float from horizontal into vertical position and by pulling into the wing section. The float may, however, be turned horizontally on the supporting stay until it is transverse to the direction of flight and pulled out of this position into the wing section.

The float according to the invention is preferably made of several hingedly connected parts. The individual parts can then be collapsed and retracted so that they lie in the wing transversely to its longitudinal direction. It is immaterial whether the individual parts of the float are folded side by side or one over the other.

According to another feature of the invention a float having a keel on one side is provided having on the keel side a flat side wall. The keel side wall and the side surfaces of the supporting stays located on the keel side are adapted to the under side of the wing.

The float can be mounted on one or several supporting stays which have the joints necessary for the swinging in. The swinging in may be effected mechanically or hydraulically in selectively introducing folding stays.

Two embodiments of the invention are illustrated by way of example in the accompanying drawings in which.

The extended float $a$ is arranged on the wing $c$ between the fuselage $b$ and the wing tip. It is pivotally secured on a point $d$ of a supporting stay $e$ at the lower end of the stay $e$ while the other end of the supporting stay $e$ is fulcrumed at $s$ to the wing $c$. An articulated stay, consisting of the parts $f$, $g$, is provided between the joint $k$ of float $a$ and the supporting stay $e$. At the folding point $h$ a turning or retracting force $i$ for the float $a$ acts, preferably in the form of a piston and cylinder, and brings the float $a$ into the position $a'$. The turning or retracting cylinder thus assumes the position $i'$ and the parts of the articulated stay assume the positions $f'$, $g'$.

Figure 4:
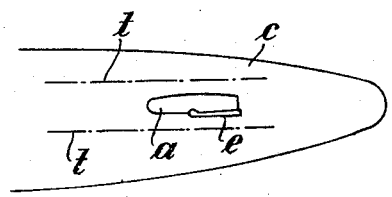
Fig. 4 shows the position of a one-piece float retracted into the wing.

The second stage of movement starts from the vertical position of the float $a$ and is effected by swinging or retracting the float by means of a piston and cylinder $m$ which engages at the folding point $n$ of a second pair of articulated stays $o$, $p$, secured to a point of fixation $q$ on the wing and to the supporting stay $e$ at $r$. The supporting stay $e$ then swings about its fulcrum $s$ located in the wing $c$ on the cross beam or the like. The float $a$, in this form of construction (Fig. 4), lies in retracted position in the wing section in the longitudinal direction thereof, between the cross beams and the parts of the folding stay at $o'$, $p'$, whereas the retracting piston and cylinder $m$ assumes the position $m'$. The support $e$ and the float $a$ form when in retracted position, a part of the wing planking.

Figure 1:
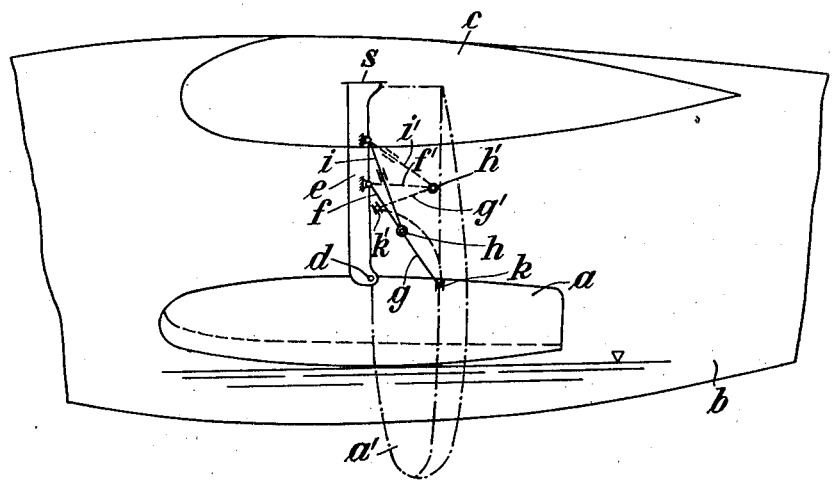
Fig. 1 shows a one-piece supporting float in side elevation.
Figure 2:
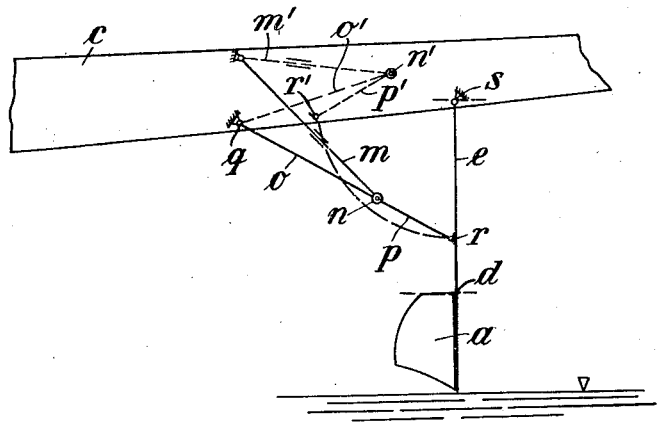
Fig. 2 is a front elevation of Fig. 1.
Figure 3:
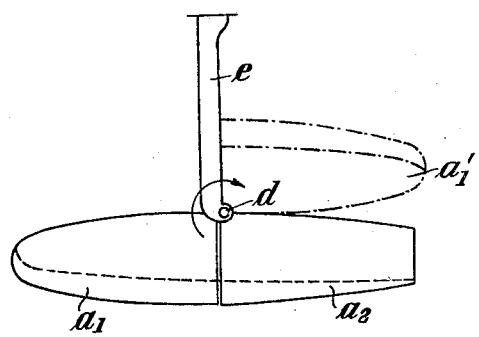
Fig. 3 shows a two-piece float in side elevation.
Figure 5:
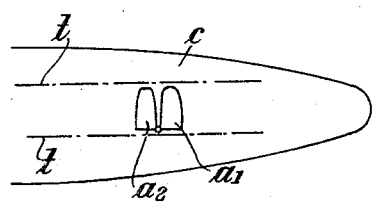
Fig. 5 shows the position of a two-piece float retracted into the wing.

Another form of construction of the float is shown in Fig. 3. A part $a_1$ of the float is folded into the position $a_1'$ before the retraction, whereas the float part $a_2$ remains in its position. The float parts $a_1'$, $a_2$ can then be swung into the wing and there lie transversely to the direction of flight between the cross beams $t$ (Fig. 5). Three-piece floats may also be used.

I claim:

1. In an aircraft including a fuselage with lateral wings having recesses in the profile thereof, a float associated with each wing, a connection between each wing and its associated float including a float supporting strut hinged at one end to the wing and at the other end to the float, means for turning the float on its hinge connection with the strut comprising a pair of pivoted levers respectively hinged at their outer ends to the strut and float, a piston and cylinder mechanism connecting the strut and pivoted levers for operating the latter, and means for retracting the float into the profile of the wing comprising a pair of pivoted levers respectively hinged to the wing and strut and a piston and cylinder mechanism connecting the wing and the last named pivoted levers for operation of the latter.

2. In an aircraft including a fuselage with lateral wings having recesses in the profile thereof, a float associated with each wing, a connection between each wing and its associated float including a float supporting strut hinged at one end to the wing and at the other end to the float, means for turning the float on its hinge connection with the strut thereby to swing the float into parallel relationship with respect to the strut, and means for swinging the strut with respect to the wing, thereby to lift and retract the float into its recess.

3. Apparatus as claimed in claim 2, wherein the strut is swung from the substantially vertical position where the float is used to a substantially horizontal position with the float extending substantially parallel to the longitudinal dimension of the wing.

4. In an aircraft including a fuselage with lateral wings having recesses in the profile thereof, a float associated with each wing, means connecting each wing and its associated float including a float supporting strut hinged at one end to the wing and at the other end to the float, a pair of pivoted levers respectively hinged at their outer ends to the strut and float, positive operating means to move said levers from their position wherein the float is positioned for use to a position wherein said float is substantially parallel to said strut, and positive operating means to swing said strut about its connection with the wing thereby to move the float from its normal position for use to and from its retracted position in its recess.

5. In an aircraft including a fuselage with lateral wings having recesses in the profile thereof, a float associated with each wing, means connecting each wing and its associated float including a float supporting strut hinged at one end to the wing and at the other end to the float, each of said wings having longitudinal spaced beams with recesses between the beams and substantially parallel thereto, positive operating means for turning each float on its hinge connection to a position parallel with respect to the strut, and positive operating means for swinging the strut about its hinged connection with the wing thereby to move the float from its position for use to and from its retractive position in the profile of the wing.

HEINRICH HERTEL.